United States Patent
Guenter

(10) Patent No.: US 11,187,909 B2
(45) Date of Patent: Nov. 30, 2021

(54) TEXT RENDERING BY MICROSHIFTING THE DISPLAY IN A HEAD MOUNTED DISPLAY

(71) Applicant: Microsoft Technology Licensing, LLC, Redmond, WA (US)

(72) Inventor: Brian K. Guenter, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 15/421,252

(22) Filed: Jan. 31, 2017

(65) Prior Publication Data

US 2018/0217383 A1    Aug. 2, 2018

(51) Int. Cl.
| | |
|---|---|
| *G02B 27/01* | (2006.01) |
| *G02B 27/00* | (2006.01) |
| *G06K 9/34* | (2006.01) |
| *G06T 19/00* | (2011.01) |
| *G06K 9/00* | (2006.01) |

(52) U.S. Cl.
CPC ..... *G02B 27/0179* (2013.01); *G02B 27/0093* (2013.01); *G06K 9/00597* (2013.01); *G06K 9/00671* (2013.01); *G02B 2027/0154* (2013.01); *G02B 2027/0187* (2013.01); *G06K 9/00335* (2013.01)

(58) Field of Classification Search
None
See application file for complete search history.

(56) References Cited

U.S. PATENT DOCUMENTS

| | | |
|---|---|---|
| 5,604,856 A | 2/1997 | Guenter |
| 6,193,660 B1 | 2/2001 | Jackson et al. |
| 6,252,989 B1 | 6/2001 | Geisler et al. |
| 6,340,994 B1 | 1/2002 | Margulis et al. |
| 6,462,768 B1 | 10/2002 | Oakley |
| 6,549,215 B2 | 4/2003 | Jouppi |
| 7,148,860 B2 | 12/2006 | Kooi et al. |
| 7,499,594 B2 | 3/2009 | Kortum et al. |
| 7,542,090 B1 | 6/2009 | Merchant |
| 7,872,635 B2 | 1/2011 | Mitchell |
| 8,223,024 B1 | 7/2012 | Petrou |
| 8,379,915 B2 | 2/2013 | Sharon et al. |
| 8,401,081 B2 | 3/2013 | Doser |
| 8,872,910 B1 | 10/2014 | Vaziri |
| 8,885,882 B1 | 11/2014 | Yin et al. |

(Continued)

OTHER PUBLICATIONS

"International Search Report and Written Report issued in PCT Application No. PCT/US2018/016187", dated Aug. 21, 2018, 15 Pages.

(Continued)

*Primary Examiner* — Krishna P Neupane

(57) ABSTRACT

Improved text rendering by microshifting the display in a head mounted display is provided. Systems, methods and computer-readable devices provide a head mounted display. The head mounted display includes a display unit; a rotational actuator coupled to the display unit; and a rotation processor having a rotation sensor coupled to the display unit wherein as the head mounted display is rotated, the rotation processor is operable to signal the rotational actuator to rotate the display unit to counter the rotation of the head mounted display.

20 Claims, 8 Drawing Sheets

(56) References Cited

U.S. PATENT DOCUMENTS

| | | |
|---|---|---|
| 8,937,771 B2 | 1/2015 | Robbins |
| 9,030,583 B2 | 5/2015 | Gove et al. |
| 9,094,677 B1 | 7/2015 | Mendis et al. |
| 9,229,540 B2 | 1/2016 | Mandella et al. |
| 9,366,862 B2 | 6/2016 | Haddick et al. |
| 9,377,852 B1 | 6/2016 | Shapiro et al. |
| 10,298,840 B2 | 5/2019 | Guenter |
| 10,354,140 B2 | 7/2019 | Guenter et al. |
| 2002/0063726 A1 | 5/2002 | Jouppi |
| 2003/0198393 A1 | 10/2003 | Berstis |
| 2004/0102713 A1 | 5/2004 | Dunn |
| 2004/0130649 A1 | 7/2004 | Lee |
| 2004/0247167 A1 | 12/2004 | Bueno et al. |
| 2005/0007453 A1 | 1/2005 | Ahiska |
| 2005/0017923 A1 | 1/2005 | Kooi et al. |
| 2005/0018911 A1 | 1/2005 | Deever |
| 2005/0096543 A1 | 5/2005 | Jackson et al. |
| 2006/0221067 A1 | 10/2006 | Kim et al. |
| 2007/0177239 A1 | 8/2007 | Tanijiri et al. |
| 2008/0002262 A1 | 1/2008 | Chirieleison |
| 2008/0247620 A1 | 10/2008 | Lewis et al. |
| 2009/0040308 A1 | 2/2009 | Temovskiy |
| 2009/0116688 A1 | 5/2009 | Monacos et al. |
| 2009/0147126 A1 | 6/2009 | Miyoshi et al. |
| 2009/0153730 A1 | 6/2009 | Knee et al. |
| 2009/0175535 A1 | 7/2009 | Mattox |
| 2010/0090929 A1 | 4/2010 | Tsujimoto |
| 2010/0142778 A1 | 6/2010 | Zhuo et al. |
| 2012/0105310 A1 | 5/2012 | Sverdrup et al. |
| 2012/0146891 A1 | 6/2012 | Kalinli |
| 2012/0176296 A1* | 7/2012 | Border .............. G02B 27/2228 345/8 |
| 2012/0300112 A1 | 11/2012 | Natsume |
| 2013/0050485 A1 | 2/2013 | Tiana |
| 2013/0125155 A1 | 5/2013 | Bhagavathy et al. |
| 2013/0169683 A1 | 7/2013 | Perez et al. |
| 2013/0285885 A1 | 10/2013 | Nowatzyk et al. |
| 2014/0085505 A1 | 3/2014 | Asuka et al. |
| 2014/0125785 A1 | 5/2014 | Na et al. |
| 2014/0218468 A1 | 8/2014 | Gao et al. |
| 2014/0247277 A1 | 9/2014 | Guenter et al. |
| 2014/0247286 A1 | 9/2014 | Chi |
| 2014/0266990 A1 | 9/2014 | Makino et al. |
| 2014/0268360 A1 | 9/2014 | Ellsworth |
| 2014/0361977 A1 | 12/2014 | Stafford et al. |
| 2014/0375680 A1 | 12/2014 | Ackerman et al. |
| 2015/0042814 A1 | 2/2015 | Vaziri |
| 2015/0070392 A1 | 3/2015 | Azulai et al. |
| 2015/0235453 A1 | 8/2015 | Schowengerdt et al. |
| 2015/0288933 A1 | 10/2015 | Iversen et al. |
| 2016/0034032 A1* | 2/2016 | Jeong .............. G06F 3/013 345/156 |
| 2016/0080653 A1 | 3/2016 | Kim et al. |
| 2016/0109712 A1 | 4/2016 | Harrison et al. |
| 2016/0187969 A1 | 6/2016 | Larsen et al. |
| 2016/0217616 A1 | 7/2016 | Kraver |
| 2016/0246055 A1 | 8/2016 | Border et al. |
| 2016/0320559 A1 | 11/2016 | Richards |
| 2016/0328030 A1* | 11/2016 | Kimura .............. G09G 5/00 |
| 2017/0359510 A1 | 12/2017 | Lane |
| 2018/0035058 A1 | 2/2018 | Thumpudi et al. |
| 2018/0075653 A1* | 3/2018 | Schillings ............ G06T 19/006 |
| 2018/0218217 A1 | 8/2018 | Guenter et al. |
| 2018/0218661 A1 | 8/2018 | Guenter |
| 2018/0220068 A1 | 8/2018 | Guenter |
| 2018/0295400 A1 | 10/2018 | Thomas et al. |
| 2019/0286909 A1 | 9/2019 | Guenter et al. |

OTHER PUBLICATIONS

"Notice of Allowance" issued in U.S. Appl. No. 15/421,185, dated Oct. 1, 2018, 9 pages.

Guenter, et al., "Foveated 3D Graphics", In Journal of ACM Transactions on Graphics, vol. 31, Issue 6, Nov. 2012, 10 Pages.

Guenter, et al., "Supplement to Foveated 3D Graphics: User Study Details", Retrieved from <<https://www.microsoft.com/en-US/research/wp-content/uploads/2012/11/userstudy07.pdf>>, Jan. 1, 2012, 4 Pages.

Jin, et al., "Analysis and Processing of Pixel Binning for Color Image Sensor", In EURASIP Journal on Advances in Signal Processing, vol. 1, Jun. 21, 2012, 22 Pages.

Lavalle, Steven M., "The Physiology of Human Vision", In Book of Virtual Reality, Chapters, Jan. 2015, 17 Pages.

Poletti, et al., "Microscopic Eye Movements Compensate for Non-homogeneous Vision within the Fovea", In Journal of Current Biology, vol. 23, Issue 17, Sep. 9, 2013, 5 Pages.

Rolland, Jannick, et al., "Head-Mounted Display Systems", In Encyclopedia of Optical Engineering, Mar. 2005, 14 Pages.

Stengel,, "An Affordable Solution for Binocular Eye Tracking and Calibration in Head-mounted Displays", In Proceedings of the 23rd ACM international conference on Multimedia, Oct. 26, 2015, 10 pages.

"Non Final Office Action issued in U.S. Appl. No. 15/421,150", dated May 31, 2018, 34 Pages.

"Non Final Office Action issued in U.S. Appl. No. 15/421,185", dated May 17, 2018, 23 Pages.

"Non Final Office Action issued in U.S. Appl. No. 15/421,228", dated Aug. 27, 2018, 23 Pages.

"Final Office Action Issued in U.S. Appl. No. 15/421,150", dated Nov. 23, 2018, 28 Pages.

"Final Office Action Issued in U.S. Appl. No. 15/421,228", dated Mar. 7, 2019, 21 Pages.

"Non-Final Office Action Issued in U.S. Appl. No. 16/431,606", dated Aug. 5, 2019, 32 Pages.

"Advisory Action Issued In U.S. Appl. No. 16/431,606", dated Mar. 16, 2020, 9 pages.

"Final Office Action Issued in U.S. Appl. No. 16/431,606", dated Dec. 20, 2019, 32 Pages.

* cited by examiner

MOBILE COMPUTING DEVICE

TEXT RENDERING BY MICROSHIFTING THE DISPLAY IN A HEAD MOUNTED DISPLAY

BACKGROUND

Augmented reality is becoming a greater part of the computer user experience. Through augmented reality, a computer user wears a headset that projects computer generated images onto a real-world scene, thus augmenting the scene with computer generated information. This information can be in the form of graphics or text. As a computer users do not keep their heads still during the use of augmented reality headsets or head mounted displays ("HMDs"), images and text being projected by an augmented reality headset will often need to move around within the computer display, so that they appear to remain stationary to the computer users. For example, if one is viewing a computer desktop on a wall, the computer desktop image must remain steady even as the computer user has minor head movements.

Unfortunately, the projection of text suffers as the HMD endeavors to maintain a steady image. Pixel hinting techniques are often used to align the pixel lattice with text. Pixel hinting is a set of techniques that change the pixel representation of the text to make the text look better on lower resolution displays. For example, vertical edges of characters are aligned with the pixel grid to appear as sharp as possible; edges are not permitted to land halfway between two pixels. Aliasing issues due to misalignment of text with the sampling grid are constant problems. Thus, text may appear blurry or text may appear to shift about on the projected virtual reality image. These constantly shifting coordinate frames are a problem when using HMDs to display text.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

Aspects are directed to improving text rendering by microshifting the display in an head mounter display. According to aspects, a head mounted display is disclosed. The head mounted display includes a display unit; a rotational actuator coupled to the display unit; and a rotation processor having a rotation sensor coupled to the display unit wherein as the head mounted display is rotated, the rotation processor is operable to signal the rotational actuator to rotate the display unit to counter the rotation of the head mounted display.

Additional aspects include a system comprising a computing device. The computing device includes at least one processing device and at least one computer readable data storage device storing instructions that, when executed by the at least one processing device are operative to improve text rendering by microshifting a display. The instructions cause the computing device to receive a rotational position of a head mounted display; receive text desired to be displayed on the head mounted display; compare the alignment of the text with the rotational position of the head mounted display; determine an amount of rotation of the head mounted display necessary to align the text with a pixel sampling lattice of displays within the head mounted display; and send a rotation value to the head mounted display, the rotation value being the amount of rotation necessary to align the text with the pixel sampling lattice of the displays within the head mounted display.

Additional aspects include a method of microshifting a display. The method including: receiving a rotational position of a head mounted display; comparing projected text alignment with a pixel sampling lattice of display units within the head mounted display; and rotating the display units within the head mounted display so that the text is aligned with the pixel sampling lattice of the display units.

Examples are implemented as a method, computer process, a computing system, or as an article of manufacture such as a device, computer program product, or computer readable medium. According to an aspect, the computer program product is a computer storage media readable by a computer system and encoding a computer program of instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

Figure 1:
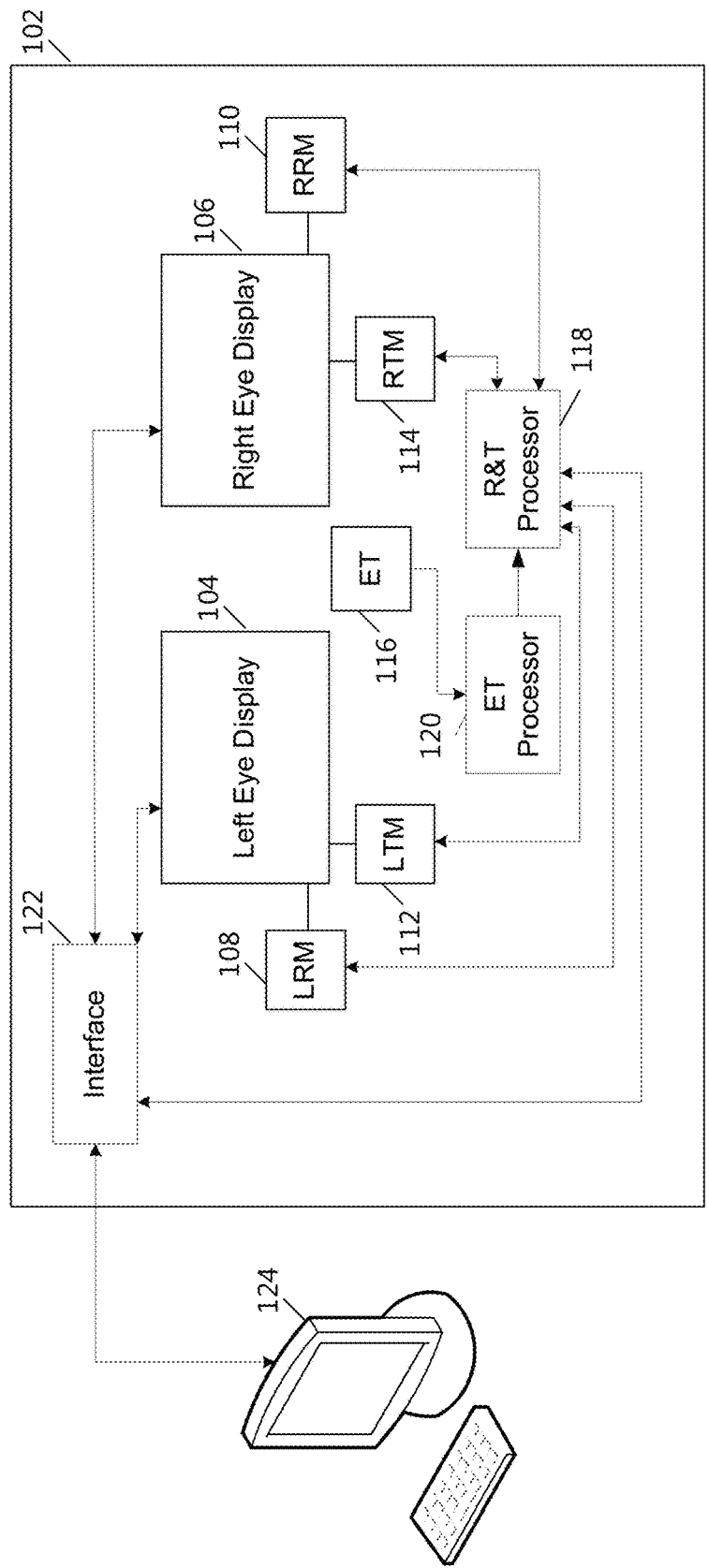
FIG. 1 is a block diagram of an example head mounted display.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Aspects of the present disclosure are directed to a method and system for improving text rendering by microshifting the display unit in a head mounted display (HMD). By rotating and/or translating display units mounted within an HMD, aliasing artifacts may be eliminated, and pixel hinting improved, through alignment of the displays with the text desired to be displayed. For example, if the user of the HMD tilts one's head by ten degrees when staring at a projected desktop on a whiteboard or blank wall, the display units within the HMD would be counter-rotated by ten degrees. This keeps the display sample lattice aligned with the characters, thus eliminating, or significantly reducing, aliasing. Also, if text were to need to be displayed between columns of pixels, the display units within the HMD may also be slightly translated, to keep the text aligned. This rotation and translation may be performed with a plurality of piezoelectric motors or actuators within the HMD for example.

FIG. 1 is a block diagram of an example head mounted display. The head mounted display 102 is designed to be worn on the head of a user who is using augmented reality to project a computer generated image. By using augmented reality, the user who is wearing the HMD may look at real world scenery and view a computer generated image superimposed on the real world imagery. Thus, for example, a computer user could look at a blank wall and see projected thereon a computer desktop. The computer desktop may appear as any type of desktop and contain applications running therein. Applications such as word processors would project a great deal of text onto the blank wall. Augmented reality is playing a greater role in the computer user experience as time progression, and high quality augmented reality displays are becoming increasingly important. Display of quality text is very important in making augmented reality an attractive feature for computer users.

The HMD 102 is coupled to a computer 124 through an interface in the HMD 102. Various communications protocols, both wired and wireless, are contemplated in coupling the HMD 102 to the computer 124. In certain aspects, the computer 124 may actually be integrated into the HMD 102. The interface to the computer 124 is typically through a graphics card in computer 124. However, the graphics card functions may be directly integrated into the HMD 102. Interface 122 is communicated with the Left Eye Display Unit 104 and the Right Eye Display Unit 106 to send the displayed image or images to the proper display unit. The Left Eye Display Unit 104 and the Right Eye Display Unit 106 may be of any range of display density, for example, from 640×480 pixels up to HD (High Definition) or even UHD (Ultra High Definition). The particular resolution of the display is not relevant to the features claimed herein, although the lower resolution the greater the need for the features described in this disclosure.

Interface 122 is further coupled to a Rotation and Translation Processor 118 embedded within the HMD 102. The Rotation and Translation Processor 118 may be responsible for sending commands to a plurality of actuators, such as piezoelectric motors 108-114, that serve to rotate and/or translate the Left Eye Display Unit 104 and the Right Eye Display Unit 106 ("the display units"). In one aspect of the present disclosure, as shown in FIG. 1, the Rotation and Translation Processor 118 is in communication with actuators specifically dedicated to each display unit. For example, the Rotation and Translation Processor 118 is coupled to a Left Rotation Motor 108, a Left Translation Motor 112, a Right Rotation Motor 110, and a Right Translation Motor 114. In other aspects, a single motor may rotate both displays and a single motor may translate both displays. Furthermore, translation may be in both the X and the Y directions, while rotation may be any angle. However, typically, rotation may be generally around +/−ten degrees, as users typically do not rotate their heads more than this amount when reading text on a display generated though augmented reality. Processor 118 can be, for example, a microprocessor, microcomputer, a digital signal processor, or a graphics processing unit.

Additionally, while the Rotation and Translation Processor 118 senses the angle of rotation of the HMD 102 and uses this to calculate the amount to rotate and potentially translate the display units 104 and 106, it is contemplated that these calculations may instead be performed by the computer 124 instead of within the HMD 102. If performed by the computer 124, then the rotation information is fed back to computer 124 and the computer 124 will return the amount of rotation and translation to be sent to the displays 104 and 106.

In certain aspects disclosed, an Eye Tracker 116 coupled to an Eye Tracking Processor 120 coupled to the Rotation and Translation Processor 118 may be provided. The purpose of the Eye Tracking Processor 120 is to follow the eyes of the user, so that when the Rotation and Translation Processor 118 performs the alignment it uses the text being particularly viewed by the user of the HMD 102 as the standard text to align with the sampling lattice of the display units 104 and 106. Similarly to the Rotation and Translation Processor 118, the functions performed by the Eye Tracking Processor 120 could be offloaded to computer 124.

As will be described in more detail with respect to FIG. 5, in practice the Rotation and Translation Processor 118 may be implemented in conjunction with the Eye Tracking Processor 120 to analyze the tilt of the HMD 102 and command a rotation and/or translation of the Left Eye Display 104 and Right Eye Display 106 as the HMD 102 goes through cycles of displaying and not displaying images. For example, with a 60 Hz display cycle, a backlight of the HMD 102 is turned off and on sixty times per second. When the backlight is off, such that nothing is projected to the user's eyes, a new display image is loaded into the Left Eye Display 104 and the right Eye Display 106. It is during this darkened time that the Rotation and Translation Processor 118 may perform the rotation and/or translation of the display units in order to properly align the text. When the backlight is turned back on, the display units will have been rotated and/or translated, and the new display graphics loaded into the display units.

Figure 2:
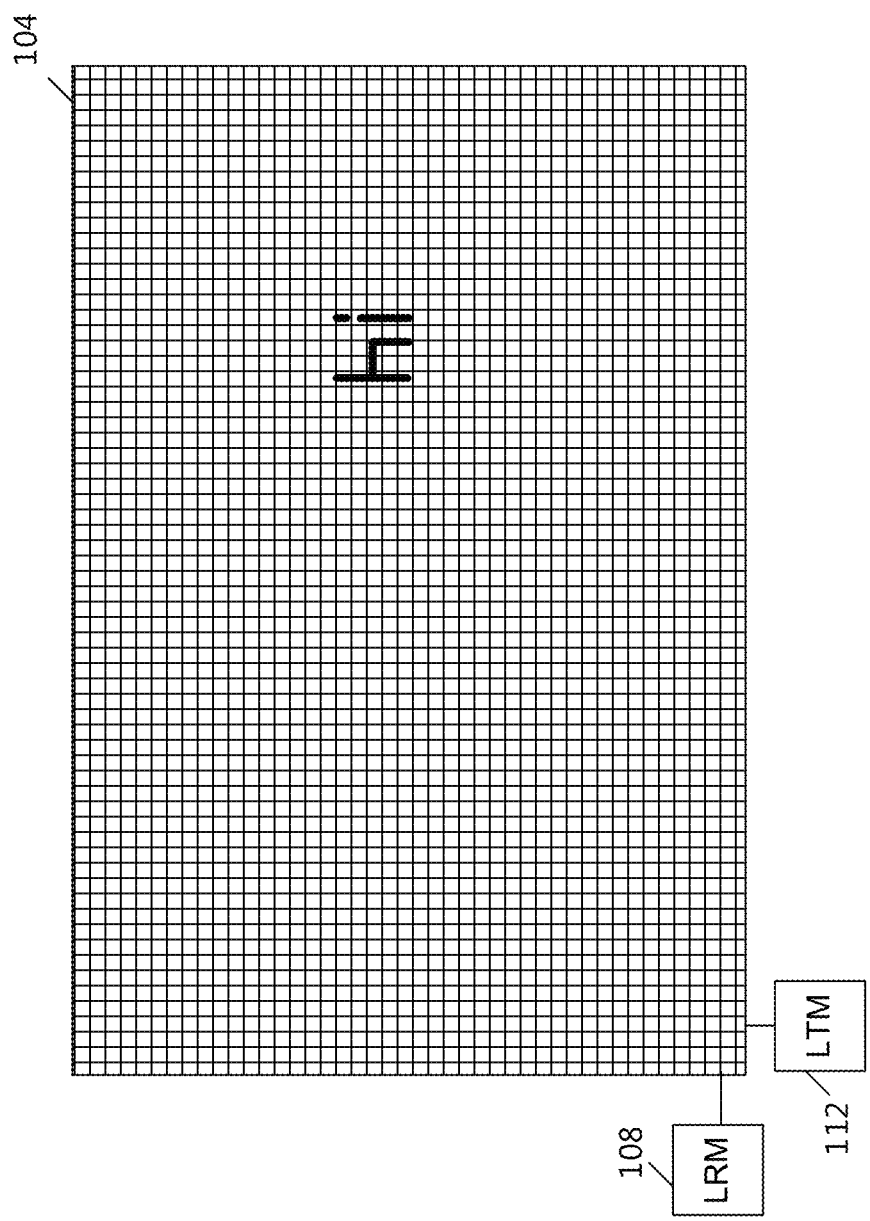
FIG. 2 is an illustration of a text image as shown on a head mounted display when the head mounted display is perfectly horizontal and aligned with a left display unit.

FIG. 2 is an illustration of a text image as shown on a head mounted display's left display unit when the head mounted display is perfectly horizontal and text aligned. Pixels are arranged in rows and columns of Left Eye Display 104. So long as the user wearing the HMD 102 maintains head orientation in a level position, the Left Rotation Motor 108 does not need to rotate and the Left Translation Motor does not need to translate the Left Eye Display 104. As can be seen, the display of the word "hi" is aligned with the grid and aliasing does not occur. If the user were to rotate or slightly translate one's head and thereby the HMD 102, the Left Rotation Motor 108 would activate to rotate the Left Eye Display 104 within and with respect to the HMD 102. If the user were to slightly shift one's head, the Left Translation Motor 112 may need to translate the Left Eye Display 104 to maintain alignment of the text within, and not between, the columns of pixels.

Figure 3:
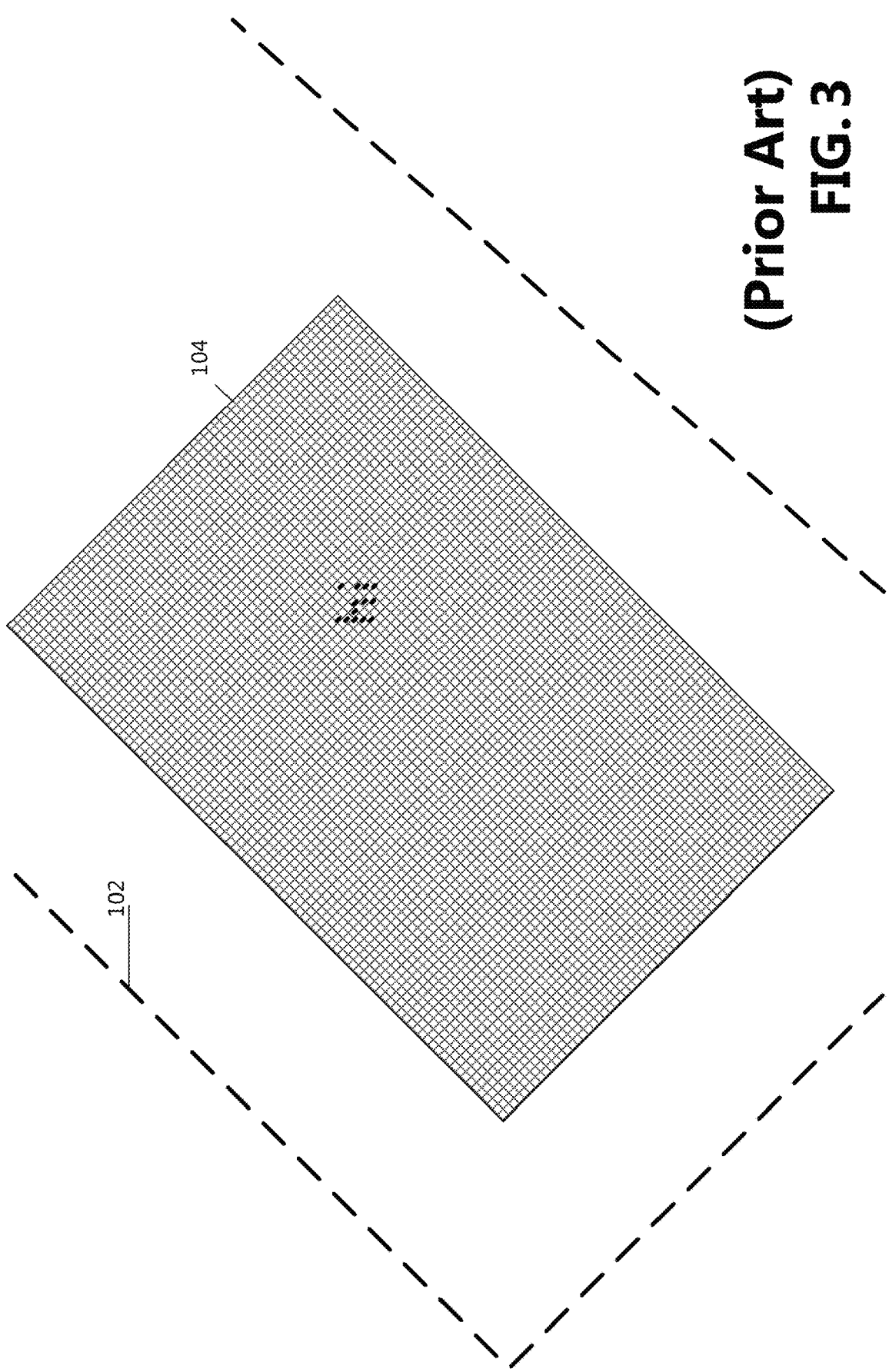
FIG. 3 is an illustration of a text image shown on a head mounted display of a prior art unit that has been rotated that does not perform microshifting.

FIG. 3 is an illustration of a text image shown on a head mounted display of a prior art unit that has been rotated that does not perform microshifting. To illustrate the problems inherent in the prior art, one can see that if the Left Display Unit 104 maintains its position relative to the HMD 102 the text becomes aliased, i.e., it becomes blocky and jagged. Once can see that as users constantly move their heads when working or using an augmented display, this causes the text to move about and not look good at certain angles. The angles shown in FIG. 3 may be somewhat exaggerated to show the problem of aliasing.

Figure 4:
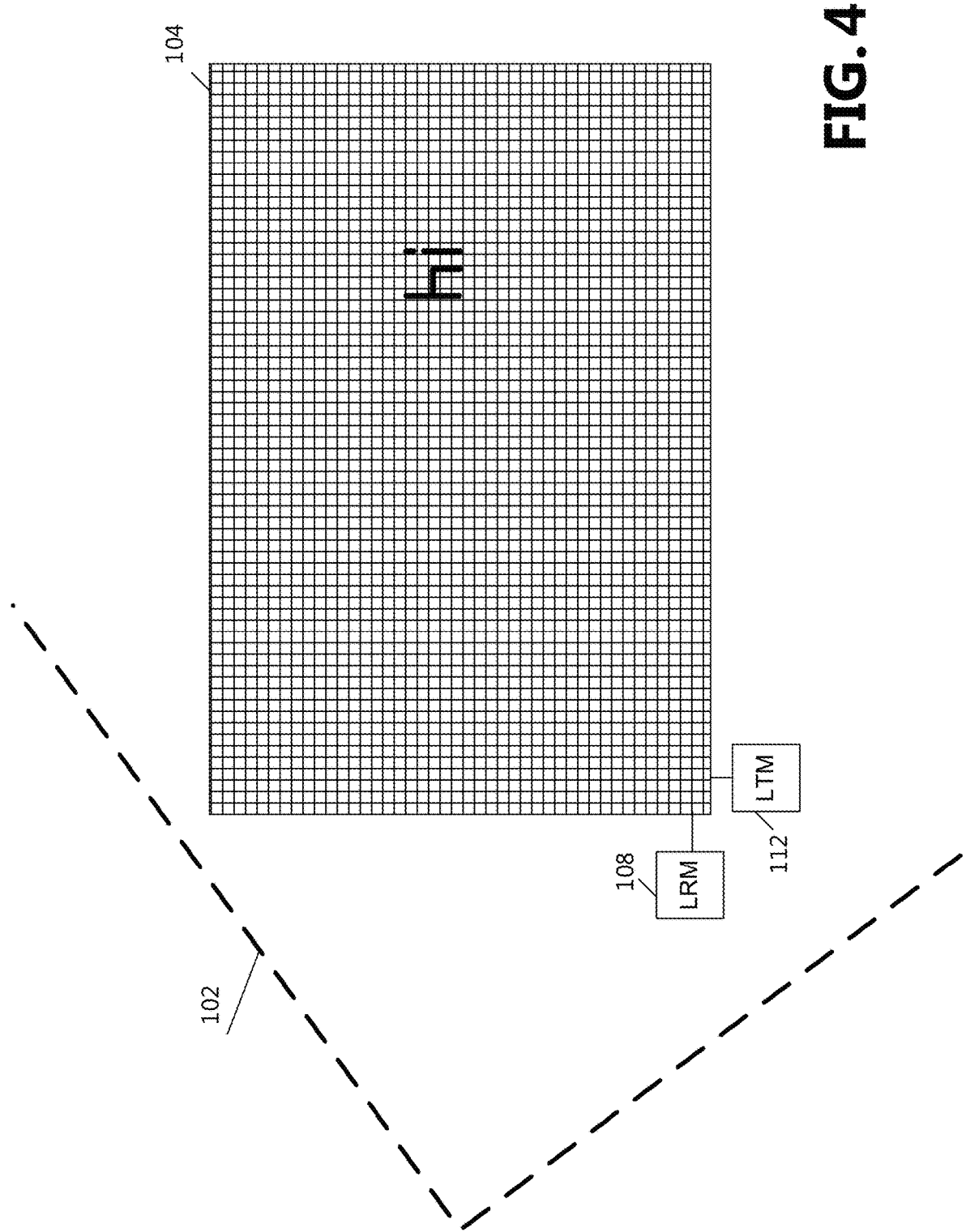
FIG. 4 is an illustration of a text image as shown on an exemplary head mounted display that does perform microshifting.

Now compare the prior art FIG. 3 with FIG. 4. FIG. 4 is an illustration of a text image as shown on an exemplary head mounted display that does perform microshifting. In this illustration, the user wearing the HMD 102 has rotated one's head to the left. The Rotation and Translation Processor 118 (now shown in this image) reads the rotation and translation of the HMD 102 and sends commands to the Left Rotation Motor 108, and possibly the Left Translation Motor 112, to counter-rotate the display units as illustrated with respect to the Left Eye Display 104 in the opposite direction by the same number of degrees as the head rotation. This maintains alignment between the text and the pixel sampling lattice of the Left Eye Display 104. Thus, the word "hi" will appear clear to the user without aliasing and having the jumping around effect seen in the prior art.

The Eye Tracking Processor 120 may also perform the function of tracking the user's eye to the word "hi" to ensure that the proper text actually being viewed is the text that is the focus of the alignment.

Through the use of rotation and translation, as well as the optional use of eye tracking, lower resolution displays can be used in HMD's, while still maintain high quality text display. Thus, this disclosure can significantly lower the cost of building HMD units.

Figure 5:
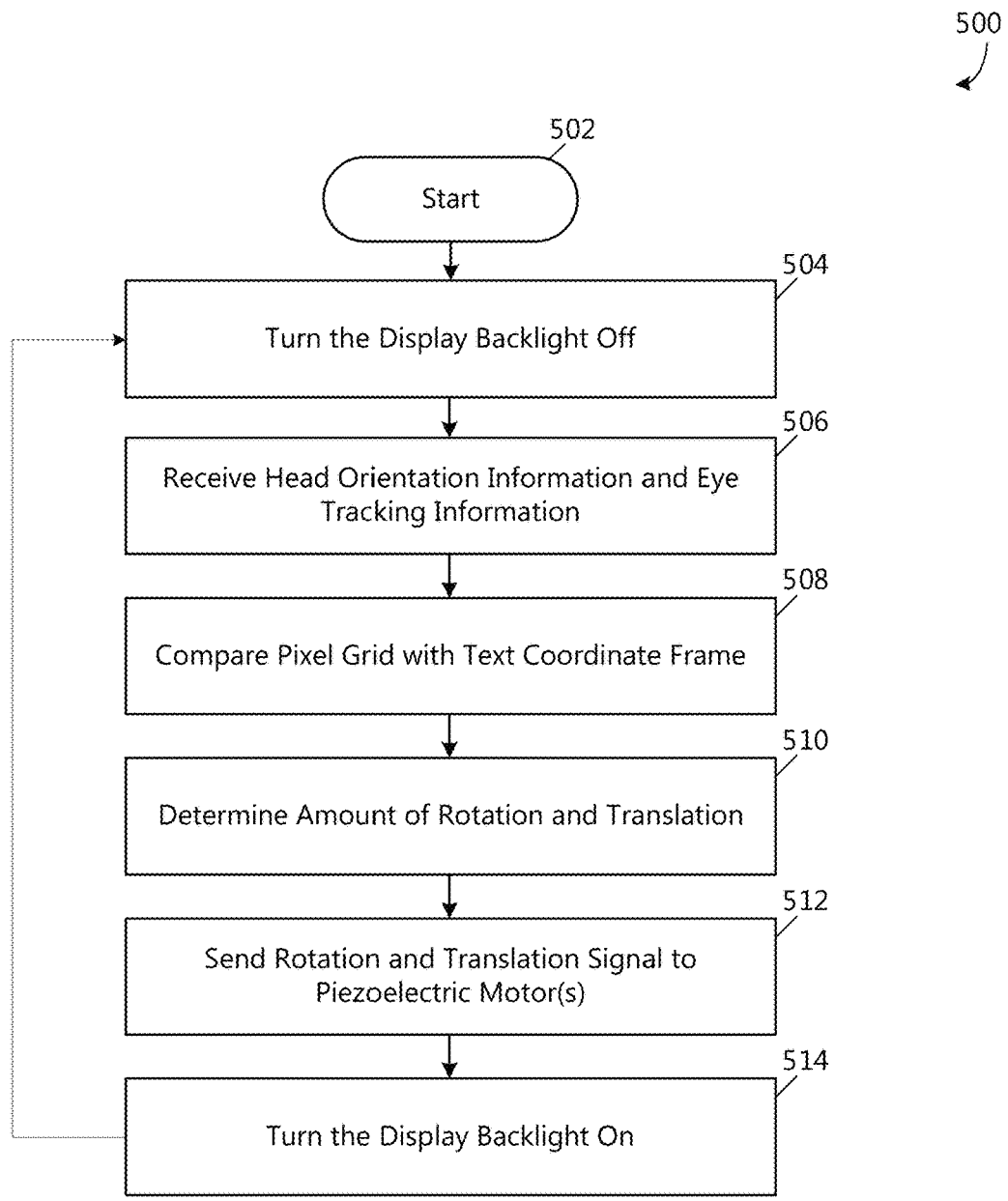
FIG. 5 is a flow chart showing general stages involved in an example method microshifting display units in a head mounted display.

FIG. 5 is a flow chart showing general stages involved in an example method 500 for microshifting display units in a head mounted display. The method 500 starts at OPERATION 502 when the HMD 102 is initially powered up. At OPERATION 504 the method 500 turns off the backlight of the two display units. It is during this time when the backlight is off that the rotation and translation of the display units occur. At OPERATION 506 the head orientation information and optional eye tracking information are received. At OPERATION 508, the pixel grid is compared with the text coordinate frame.

At OPERATION 510, the amount of rotation and/or translation is calculated. For example, if the HMD 102 has been rotated ten degrees counterclockwise, then the display units may need to be rotated around ten degrees clockwise, depending on the text within the frame. Also, if text were to be displayed on the boundary between pixel columns or pixel rows, the text would be respectively translated in the x direction and/or y direction to keep the text lined up with the pixel boundaries. At OPERATION 512 the rotation and translation signals are sent respectively to the rotation motors and/or translation motors. At OPERATION 514 the display is turned back on for a period of time to display the computer generated images to the user of the HMD 102.

The aspects and functionalities described herein may operate via a multitude of computing systems including, without limitation, head mounted displays with and without computer assistance, or head mounted displays in conjunction with desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers.

In addition, according to an aspect, the aspects and functionalities described herein may operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 6:
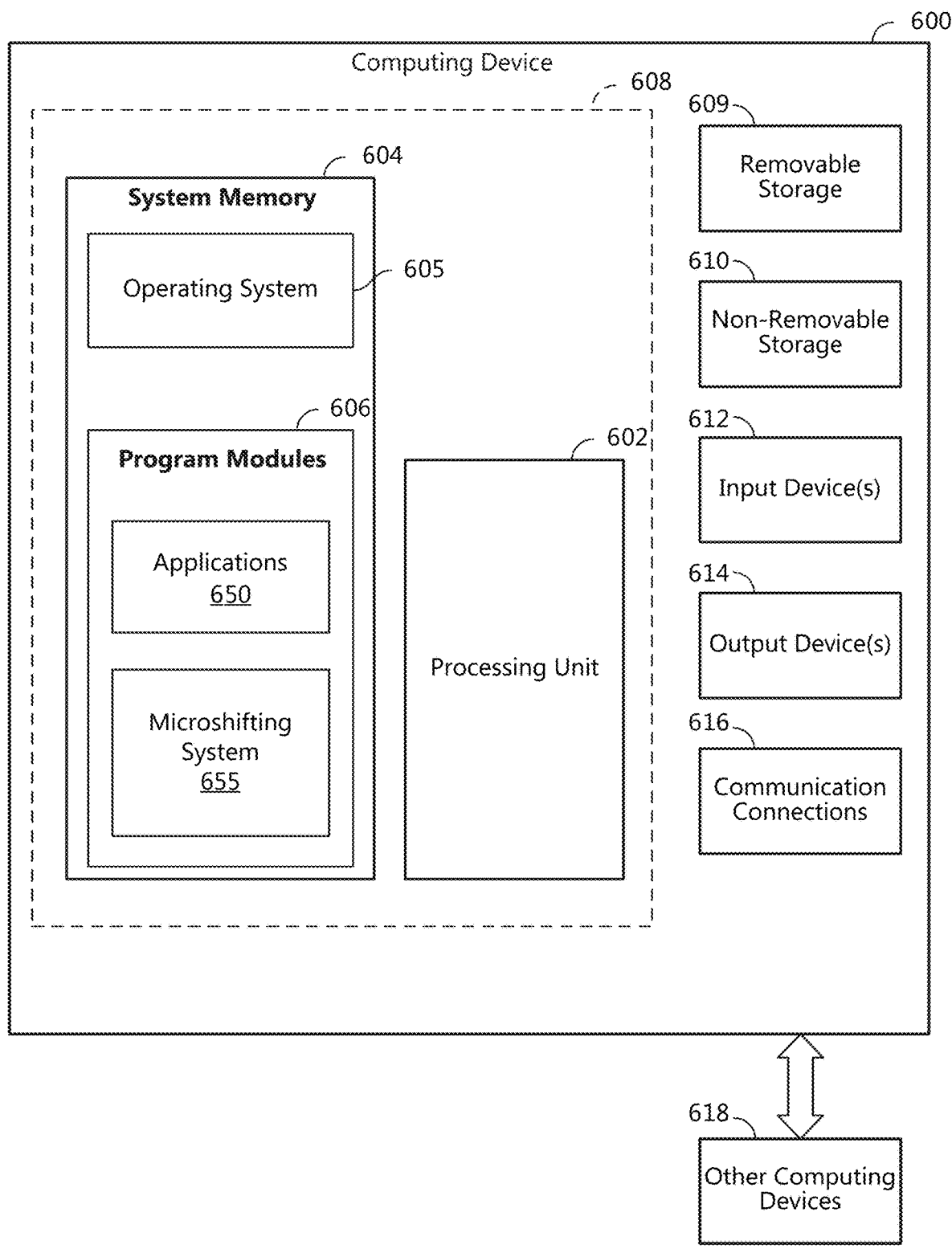
FIG. 6 is a block diagram illustrating example physical components of a computing device.

FIGS. 6 and 7 and the associated descriptions provide a discussion of a variety of operating environments in which examples are practiced. However, the devices and systems illustrated and discussed with respect to FIGS. 6 and 7 are for purposes of example and illustration and are not limiting of a vast number of computing device configurations that are utilized for practicing aspects, described herein.

FIG. 6 is a block diagram illustrating physical components (i.e., hardware) of a computing device 600 with which examples of the present disclosure may be practiced. In a basic configuration, the computing device 600 includes at least one processing unit 602 and a system memory 604. According to an aspect, depending on the configuration and type of computing device, the system memory 604 comprises, but is not limited to, volatile storage (e.g., random access memory), non-volatile storage (e.g., read-only memory), flash memory, or any combination of such memories. According to an aspect, the system memory 604 includes an operating system 605 and one or more program modules 606 suitable for running software applications 650. According to an aspect, the system memory 604 includes the micropositioning system 655. The operating system 605, for example, is suitable for controlling the operation of the computing device 600. Furthermore, aspects are practiced in conjunction with a graphics library, other operating systems, or any other application program, and are not limited to any particular application or system. This basic configuration is illustrated in FIG. 6 by those components within a dashed line 608. According to an aspect, the computing device 600 has additional features or functionality. For example, according to an aspect, the computing device 600 includes additional data storage devices (removable and/or non-removable) such as, for example, magnetic disks, optical disks, or tape. Such additional storage is illustrated in FIG. 6 by a removable storage device 609 and a non-removable storage device 610.

As stated above, according to an aspect, a number of program modules and data files are stored in the system memory 604. While executing on the processing unit 602, the program modules 606 (e.g., micropositioning system 655) perform processes including, but not limited to, one or more of the stages of the method 500 illustrated in FIG. 5. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 6 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 600 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 600 has one or more input device(s) 612 such as a keyboard, a mouse, a pen, a sound input device, a touch input device, etc. The output device(s) 614 such as a head mounted display, speakers, a printer, etc. are also included according to an aspect. The aforementioned devices are examples and others may be used. According to an aspect, the computing device 600 includes one or more communication connections 616 allowing communications with other computing devices 618. Examples of suitable communication connections 616 include, but are not limited to, radio frequency (RF) transmitter, receiver, and/or transceiver circuitry; universal serial bus (USB), parallel, and/or serial ports.

The term computer readable media as used herein include computer storage media. Computer storage media include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (i.e., memory storage.) According to an aspect, computer storage media includes RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. According to an aspect, any such computer storage media is part of the computing device 600. Computer storage media does not include a carrier wave or other propagated data signal.

According to an aspect, communication media is embodied by computer readable instructions, data structures, program modules, or other data in a modulated data signal, such as a carrier wave or other transport mechanism, and includes any information delivery media. According to an aspect, the term "modulated data signal" describes a signal that has one or more characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

Figure 7A:
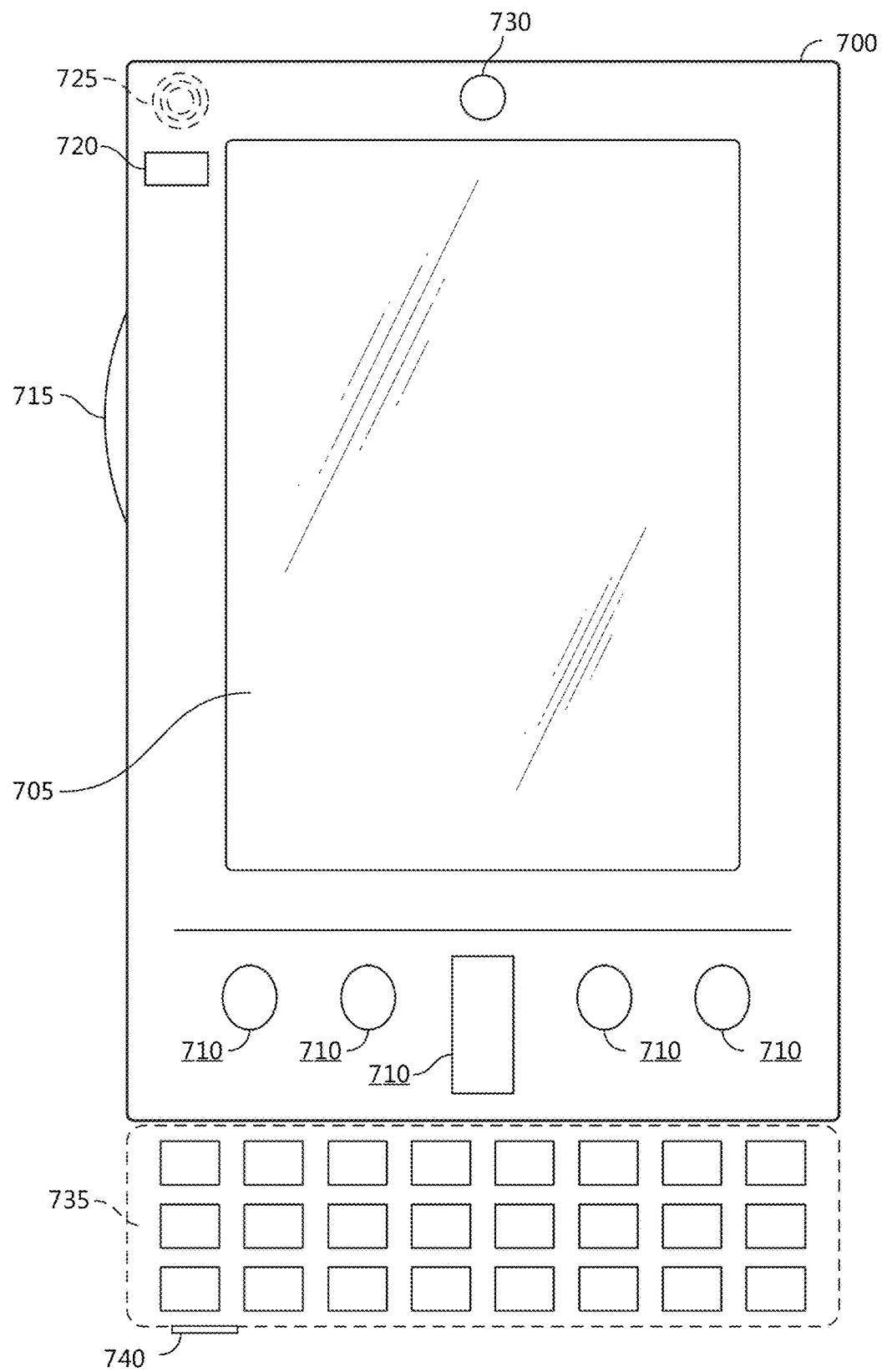
FIGS. 7A and 7B are simplified block diagrams of a mobile computing device.
Figure 7B:
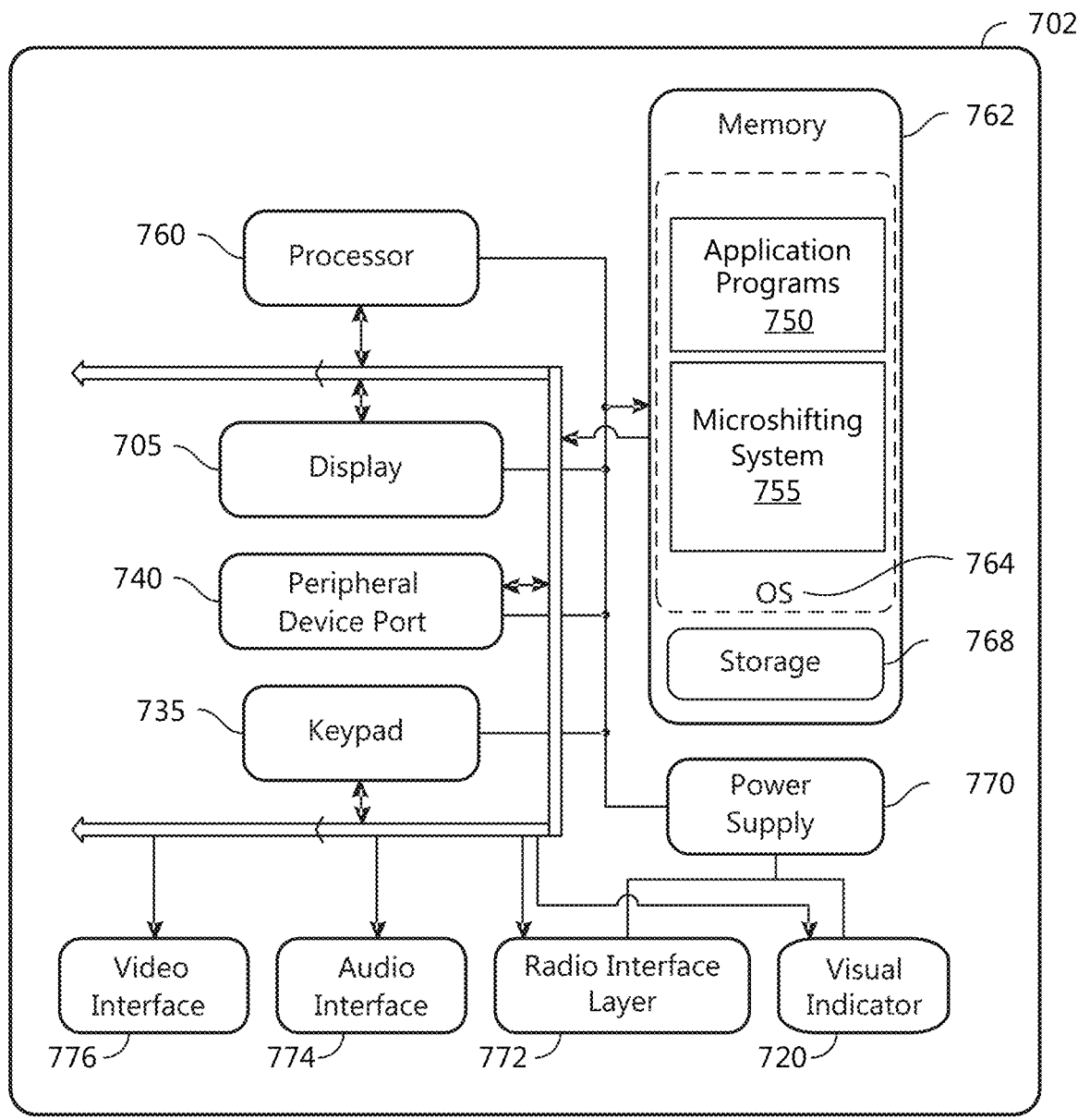

FIGS. 7A and 7B illustrate a mobile computing device 700, for example, a mobile telephone, a smart phone, a tablet personal computer, a laptop computer, and the like, with which aspects may be practiced. With reference to FIG. 7A, an example of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. According to an aspect, the display 705 of the mobile computing device 700 functions as an input device (e.g., a touch screen display). If included, an optional side input element 715 allows further user input. According to an aspect, the side input element 715 is a rotary switch, a button, or any other type of manual input element. In alternative examples, mobile computing device 700 incorporates more or less input elements. For example, the display 705 may not be a touch screen in some examples. In alternative examples, the mobile computing device 700 is a portable phone system, such as a cellular phone. According to an aspect, the mobile computing device 700 includes an optional keypad 735. According to an aspect, the optional keypad 735 is a physical keypad. According to another aspect, the optional keypad 735 is a "soft" keypad generated on the touch screen display. In various aspects, the output elements include the display 705 for showing a graphical user interface (GUI), a visual indicator 720 (e.g., a light emitting diode), and/or an audio transducer 725 (e.g., a speaker). In some examples, the mobile computing device 700 incorporates a vibration transducer for providing the user with tactile feedback. In yet another example, the mobile computing device 700 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 700 incorporates peripheral device port 740, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one example of a mobile computing device. That is, the mobile computing device 700 incorporates a system (i.e., an architecture) 702 to implement some examples. In one example, the system 702 is implemented as a "smart phone" capable of running one or more applications (e.g., browser, e-mail, calendaring, contact managers, messaging clients, games, and media clients/players). In some examples, the system 702 is integrated as a computing device, such as an integrated personal digital assistant (PDA) and wireless phone.

According to an aspect, one or more application programs 750 are loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. According to an aspect, the micropositioning system 655 is loaded into memory 762. The system 702 also includes a non-volatile storage area 768 within the memory 762. The non-volatile storage area 768 is used to store persistent information that should not be lost if the system 702 is powered down. The application programs 750 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700.

According to an aspect, the system 702 has a power supply 770, which is implemented as one or more batteries. According to an aspect, the power supply 770 further includes an external power source, such as an AC adapter or a powered docking cradle that supplements or recharges the batteries.

According to an aspect, the system 702 includes a radio 772 that performs the function of transmitting and receiving radio frequency communications. The radio 772 facilitates wireless connectivity between the system 702 and the "outside world," via a communications carrier or service provider. Transmissions to and from the radio 772 are conducted under control of the operating system 764. In other words, communications received by the radio 772 may be disseminated to the application programs 750 via the operating system 764, and vice versa.

According to an aspect, the visual indicator 720 is used to provide visual notifications and/or an audio interface 774 is used for producing audible notifications via the audio transducer 725. In the illustrated example, the visual indicator 720 is a light emitting diode (LED) and the audio transducer 725 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. According to an aspect, the system 702 further includes a video interface 776 that enables an operation of an on-board camera 730 to record still images, video stream, and the like.

According to an aspect, a mobile computing device 700 implementing the system 702 has additional features or functionality. For example, the mobile computing device 700 includes additional data storage devices (removable and/or non-removable) such as, magnetic disks, optical disks, or tape. Such additional storage is illustrated in FIG. 7B by the non-volatile storage area 768.

According to an aspect, data/information generated or captured by the mobile computing device 700 and stored via the system 702 is stored locally on the mobile computing device 700, as described above. According to another aspect, the data is stored on any number of storage media that is accessible by the device via the radio 772 or via a wired connection between the mobile computing device 700 and a separate computing device associated with the mobile computing device 700, for example, a server computer in a distributed computing network, such as the Internet. As should be appreciated such data/information is accessible via the mobile computing device 700 via the radio 772 or via a distributed computing network. Similarly, according to an aspect, such data/information is readily transferred between computing devices for storage and use according to well-known data/information transfer and storage means, including electronic mail and collaborative data/information sharing systems.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

I claim:

1. A head mounted display, comprising:
a display unit;
a translation actuator to translate the display unit in the x and y directions, the translation actuator coupled to the display unit and a rotation and translation processor;
a rotational actuator coupled to the display unit; and
the rotation and translation processor having at least a rotation sensor coupled to the display unit wherein as the head mounted display is rotated, the rotation and translation processor is operable to:
receive a display signal from a computer interface;
extract text information from the display signal;
compare the text information to a pixel lattice;
based on the comparison, generate a first signal to the rotational actuator to activate the rotational actuator to rotate physically the display unit to counter the rotation of the head mounted display and to align the text information with the pixel lattice; and
performing a translation to mitigate aliasing, wherein performing the translation comprises generating a second signal to the translation actuator to activate the translation actuator to translate physically the display unit to counter shifts in an x or y direction of the head mounted display and to align the text information with the pixel lattice, wherein an amount of translation is determined to move text that would be otherwise be displayed between pixels onto the pixel lattice.

2. The head mounted display of claim 1, further comprising the computer interface coupled to the display unit and the rotation and translation processor.

3. The head mounted display of claim 1, wherein the text information includes a location of text.

4. The head mounted display of claim 1, wherein the rotation and translation processor is further operable to perform translation processing to generate the second signal to the translation actuator.

5. The head mounted display of claim 4, wherein the second signal is based on maintaining alignment between the extracted text information and the pixel lattice of the display unit.

6. The head mounted display of claim 1, further comprising an eye tracking unit coupled to an eye tracking processor.

7. The head mounted display of claim 6, wherein the eye tracking processor determines a coordinate position at which the user's eye is looking and the extracted text information is based on the coordinate position.

8. The head mounted display of claim 1, wherein the rotation and translation processor is operable to turn off a backlight to the display unit prior to signaling the rotation actuator to rotate the display unit.

9. The head mounted display of claim 1, wherein the rotation and translation processor is operable to turn on a backlight to the display unit after signaling the rotation actuator to rotate the display unit.

10. The method of claim 1, wherein rotating physically the display unit to counter the rotation of the head mounted display comprises rotating the display unit in the opposite direction of head motion by the same number of degrees as the head motion.

11. A system comprising a computing device, the computing device comprising:
at least one processing device; and
at least one computer readable data storage device storing instructions that, when executed by the at least one processing device are operative to:
receive a rotational position of a head mounted display;
receive text desired to be displayed on the head mounted display;
compare an alignment of the text with the rotational position of the head mounted display;
determine an amount of rotation of the head mounted display necessary to align the text with a pixel lattice of displays within the head mounted display;
send a rotation value to a rotation actuator of the head mounted display, the rotation value being an amount of rotation necessary to align physically the text with the pixel lattice of the displays within the head mounted display;
compare the alignment of the text with an alignment of the displays of the head mounted display;
determine an amount of translation of the head mounted display necessary to align the text with the pixel lattice of the displays within the head mounted display; and
perform a translation to mitigate aliasing, wherein performing the translation comprises sending a translation value to a translation actuator of the head mounted display to physically move the head mounted display, the translation value being an amount of translation necessary to align physically the text that would otherwise be displayed between pixels with the pixel lattice of the displays within the head mounted display.

12. The system of claim 11, wherein when determining the amount of translation the at least one processing device is further operative to:
calculate an amount of horizontal or vertical movement necessary to align the text with the pixel lattice.

13. The system of claim 11, further operative to:
receive an eye tracking location from the head mounted display; and
determine an amount of rotation of the head mounted display necessary to align text at the location of the eye tracking with the pixel lattice of displays within the head mounted display.

14. The system of claim 11, further operative to send a command to the head mounted display to turn off the display prior to applying the rotation value.

15. The system of claim 14, further operative to send a command to the head mounted display to turn on the display after applying the rotation value.

16. A method comprising:
receiving a rotational position of a head mounted display;
receiving an alignment of display units in the head mounted display;
comparing projected alignment of text with a pixel lattice of display units within the head mounted display;
physically rotating the display units within the head mounted display so that the text is aligned with the pixel lattice of the display units; and
performing a translation to mitigate aliasing, wherein performing the translation comprises physically translating the display units within the head mounted display so that the text is aligned with the pixel lattice of the display units, wherein physically translating the display comprises determining an amount of translation to move text that would otherwise be displayed between pixels onto the pixel lattice.

17. The method of claim 16, further comprising receiving an eye tracking position of an eye of a user wearing the head mounted display; and
prior to comparing the projected alignment of the text, selecting the projected alignment of the text based on the eye tracking position of the user.

18. The method of claim 16, further comprising turning off a backlight of the head mounted display prior to rotating the display units.

19. The method of claim 18, further comprising turning on the backlight of the head mounted display after rotating the display units.

20. The method of claim 16, wherein physically rotating the display units comprises rotating the display units in the opposite direction of head motion by the same number of degrees as the head motion.

* * * * *